United States Patent [19]

Klomp et al.

[11] Patent Number: 5,648,575

[45] Date of Patent: *Jul. 15, 1997

[54] METHOD FOR INHIBITING THE PLUGGING OF CONDUITS BY GAS HYDRATES

[75] Inventors: Ulfert Cornelis Klomp, Amsterdam, Netherlands; Vitold Raimond Kruka, Houston, Tex.; Rene Reijnhart; Anton Jacobus Weisenborn, both of Amsterdam, Netherlands

[73] Assignee: Shell Oil Company, Houston, Tex.

[ * ] Notice: The term of this patent shall not extend beyond the expiration date of Pat. No. 5,460,728.

[21] Appl. No.: 370,954

[22] Filed: Jan. 10, 1995

[51] Int. Cl.$^6$ .................................................. C07C 9/00
[52] U.S. Cl. .................................... 585/15; 585/899
[58] Field of Search ............................ 585/15, 899

[56] References Cited

U.S. PATENT DOCUMENTS

| | | | |
|---|---|---|---|
| 3,644,107 | 2/1972 | Clark | 48/190 |
| 3,676,981 | 7/1972 | Aldahl et al. | 55/30 |
| 3,857,686 | 12/1974 | Arnold et al. | 252/79 |
| 4,256,282 | 3/1981 | Goldschild et al. | 251/58 |
| 4,456,067 | 6/1984 | Pinner, Jr. | 166/279 |
| 4,915,176 | 4/1990 | Sugier et al. | 166/371 |
| 5,076,364 | 12/1991 | Hale et al. | 166/310 |
| 5,127,231 | 7/1992 | Larue et al. | 62/20 |
| 5,331,105 | 7/1994 | Duncum et al. | 585/800 |
| 5,460,728 | 10/1995 | Klomp et al. | 585/899 |

FOREIGN PATENT DOCUMENTS

| | | |
|---|---|---|
| 0 309 210 A1 | 3/1989 | European Pat. Off. . |
| WO93/25798 | 12/1993 | WIPO . |

OTHER PUBLICATIONS

J. H. van der Walls and J. C. Platteeuw, "Clathrate Solutions," Advances in Chemical Physics, 2: 1-57 (1959) no month available.

Arthur L. DeVries, "Biological Antifreeze Agents in Cold-water Fishes," Comparative Biochemistry and Physiology, vol. 73A, No. 4, 627-640 (1982) no month available.

F. Franks, J. Darlington, T. Schenz, S. F. Mathias, L. Slade, and H. Levine, "Antifreeze Activity of Antarctic Fish Glycoprotein and a Synthetic Polymer," Nature, vol. 325, 146-147 (Jan. 8, 1987).

Robin L. Sutton, "Critical Cooling Rates to Avoid Ice Crystallization in Aqueous Cryoprotectant Solutions Containing Polymers," J. Chem. Soc. Faraday Trans. 1991, 87(23), 3747-3751. no month available.

K. H. Ziller and H. H. Rupprecht, "Control of Crystal Growth in Drug Suspensions," from the Department of Pharmaceutical Technology, University of Regensburg, Federal Republic of Germany, Pharm. Ind. 52, Nr. 8, 1017-1022 (1990). no month available.

Primary Examiner—Glenn A. Caldarola
Assistant Examiner—Elizabeth D. Wood
Attorney, Agent, or Firm—Del S. Christensen

[57] ABSTRACT

The plugging of conduits containing a mixture of low-boiling hydrocarbons and water in inhibited by adding to the mixture an effective amount of at least one alkylated compound of the general formula formula

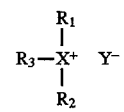

wherein $R_1$ and $R_2$ each are independently chosen from normal or branched alkyls containing a chain of at least 4 carbon atoms, $R_5$ is an organic moiety containing a chain of at least 4 atoms, X is S, N—$R_4$ or P—$R_4$, $R_4$ is H or an organic substituent, suitably an alkyl or alkenyl group having from 8 to 20 carbon atoms, and Y— is an anion.

28 Claims, No Drawings

METHOD FOR INHIBITING THE PLUGGING OF CONDUITS BY GAS HYDRATES

RELATED APPLICATIONS

This application is related to U.S. patent application Ser. No. 08/171,544, filed on Dec. 21, 1993 and now U.S. Pat. No. 5,460,728, and U.S. patent application Ser. No. 08/254,384, filed on Jun. 6, 1994 and now abandoned.

FIELD OF THE INVENTION

This invention relates to a method for inhibiting the plugging by gas hydrates of conduits containing a mixture of low-boiling hydrocarbons and water.

BACKGROUND OF THE INVENTION

Low-boiling hydrocarbons, such as methane, ethane, propane, butane and iso-butane, are present in natural gas and also in crude oil. Because water may also be present in varying amounts in natural gas and crude oil, the mixture, under conditions of elevated pressure and reduced temperature, tends to form gas hydrate crystals. Gas hydrates are clathrates (inclusion compounds) of gases in a lattice consisting of water molecules. The maximum temperature at which gas hydrates can be formed strongly depends on the pressure of the system. For example, ethane at a pressure of approximately 1 MPa can form hydrates only at temperatures below 4° C. whereas at a pressure of 3 MPa stable hydrates can be present at temperatures as high as 14° C. With respect to this strong dependence of the hydrate melting point on pressure, hydrates markedly differ from ice.

As described by M. yon Stackelberg and H. R. Muller (Z. Electrochem., 58, 25 (1954)), methane and ethane hydrates form cubic lattices having a lattice constant of 1.2 nm (hydrate structure I). The lattice constant of the cubic propane and butane gas hydrates is 1.73 nm (hydrate structure II). However, the presence of even small amounts of propane in a mixture of low-boiling hydrocarbons will result in the formation of gas hydrates having structure II (J. H. van der Waals and J. C. Platteeuw, Adv. Chem. Phys. 2, 1 (1959)).

It has been known for a long time, that gas hydrate crystals, when allowed to form and grow inside a conduit such as a pipeline, tend to block or even damage the conduit. To prevent such blocking, the following measures are possible in principle: removal of free water; maintaining elevated temperatures; and/or reduced pressures or the addition of melting point depressants (antifreezes). In practice, antifreezes are most frequently used. However, antifreezes, such as the lower alcohols and glycols, have to be added in substantial amounts to be effective, typically several tens of percent by weight of the water present. A disadvantage of such amounts is the cost of the antifreeze, and that recovery is relatively expensive.

An attractive alternative to the anti-hydrate measures described above, particularly the antifreezes, is to use a crystal growth inhibitor. The principle of interfering with crystal growth is known.

Plants and poikilothermic animals such as insects and cold-water fish are known to protect themselves from freezing, both by antifreezes such as glycols and by special peptides and glycopeptides (termed antifreeze proteins and antifreeze glycoproteins) that interfere with ice crystal growth (A. L. de Vries, Comp. Blochem. Physiol, 73, 627 (1982)). The present applicants found such cold-water fish peptides and glycopeptides also to be effective in interfering with the growth of gas-hydrate crystals. However, their production and use for this purpose are currently considered to be uneconomical.

In EPO Patent Application No. 92,201,725.6 the use of polymers and copolymers of N-vinyl-2-pyrrolidone for inhibiting the formation, growth and/or agglomeration of gas hydrate crystals is disclosed.

It is therefore an object of the present invention to provide a method to inhibit formation of hydrates in streams containing at least some light hydrocarbons and water. It is a further object to provide such a method wherein a high concentration of additive is not required.

SUMMARY OF THE INVENTION

It has now been found that certain alkylated ammonium, phosphonium or sulphonium compounds are very effective, at relatively low concentrations, in interfering with the growth of gas hydrate crystals. These compounds can therefore be very useful in inhibiting the plugging by gas hydrates of conduits containing low-boiling hydrocarbons and water. The subject compounds have three or four organic groups in their molecule, at least three of which have at least four atoms.

These and other objects are therefore accomplished by a method for inhibiting the plugging of a conduit, the conduit containing a flowing mixture comprising an amount of hydrocarbons having from one to five carbons and an amount of water wherein the amounts of hydrocarbons and water could form hydrates at conduit temperatures and pressures, the method comprising the steps of:

adding to the mixture an amount of a hydrate formation inhibitor component of the formula

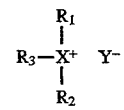

wherein $R_1$ and $R_2$ are independently chosen from the group consisting of normal and branched alkyls having at least 4 carbon atoms, $R_3$ is an organic moiety containing a chain of at least four atoms, X is selected from the group consisting of S, N—$R_4$, and P—$R_4$, $R_4$ is selected from the group consisting of hydrogen and an organic substituent, and $Y^-$ is an anion, the amount of the hydrate formation inhibitor effective to inhibit formation of hydrates in the mixture at conduit temperatures and pressures; and flowing the mixture containing the hydrate formation inhibitor through the conduit.

Ammonium (X is N—$R_4$) and phosphonium (X is P—$R_4$) alkylated compounds are preferred as $X^+$ of the present invention. As indicated above, $R_4$ can be very broadly chosen. $R_4$ may also contain one or more heteroatoms, such as oxygen, nitrogen or sulfur. Heteroatom-containing moieties such as those suitable as $R_3$ may also be useful as $R_4$. More in particular, $R_4$ is preferably chosen from the group of alkyls, alkenyls, aryls, arylalkyls, arylalkenyls, alkylaryls, alkenylaryls and glycols having from 1 to 20 carbon atoms.

Ammonium or phosphonium alkylated compounds according to the invention are preferred wherein $R_4$ is hydrogen or an alkyl or alkenyl group having from 1 to 20 carbon atoms, more preferably 4 to 20 carbon atoms. A suitable alkenyl group is 9-octadecenyl. The alkyl or alkenyl chains may be substituted with, for example, oxygen or nitrogen moieties.

The alkylated compounds according to the invention can be chemically bound through their $R_4$ group to polymers. They then are branches of these polymers. Examples of polymers to which the alkylated compounds according to the invention can be suitably bound include polyacrylic acid, and polymers and copolymers of N-vinyl-2-pyrrolidone.

DETAILED DESCRIPTION OF THE INVENTION

The anions of the alkylated compounds according to the invention can be broadly chosen. Preferred anions are the hydroxide, carboxylates, halides, sulphates and organic sulphonate ions.

When the fourth group $R_4$ of an alkylated compound according to the present invention is a longer alkyl or alkenyl chain (e.g., one containing more than 12 carbon atoms), its surface-active properties may give the subject compound, in addition to its inherent hydrate crystal growth-inhibiting properties, the following very important additional advantages:

- emulsify the aqueous into the hydrocarbon phase, thereby keeping the concentration of water available for hydrate forming at the conduit wall small;
- concentrate the subject compound near the water-hydrocarbon interfaces, where hydrate formation is most pronounced, thereby raising the local concentration of ions;
- modify the structure of water near the hydrocarbon-water interface in such a way that the formation of hydrate crystals is hindered;
- impede further access of water molecules to the hydrate crystal after attachment of the subject compound to the hydrate crystals;
- prevent agglomeration of hydrate crystals by making their surface hydrophobic; and
- adhere the subject compound to the conduit wall, thereby preventing the adhesion of hydrates to the conduit wall.

Particularly preferred alkylated compounds of the invention are those having a cation selected from the group consisting of tetrapentylammonium, tripentylbutylammonium, triisopentylbutylammonium, tripentyldecylammonium, triisopentylammonium, tributyloctadecylammonium, tetrabutylphosphonium and tributyl(9-octadecenyl)phosphonium.

At the point where the hydrocarbons are collected, e.g., at the end of the conduit, the mixture containing hydrocarbons, water and the additive according to this invention are allowed to flow into a separation device, usually a separator vessel, and a stream of gaseous hydrocarbons, a stream of liquid hydrocarbons and an aqueous phase are produced. The aqueous phase will generally contain the alkylated compound and any hydrate formed.

A further important aspect of the present invention relates to the possibility for a simple recovery of the alkylated compound, so that the alkylated compound may be re-used. To that end the alkylated compounds of formula I are employed in which $X^+$ represent $N—H^+$ or $P—H^+$. These compounds are, at least to some extent, soluble in water so that they will exert their hydrate-inhibiting effect. At the point where the hydrocarbons are collected, usually the end of the conduit, the alkylated compound is neutralized by addition of a basic compound, thereby releasing a compound of the formula $R_1R_2R_3N$ or $R_1R_2R_3P$. This compound may be easily recovered due to its lower solubility.

Accordingly, the present invention further provides a method for inhibiting the plugging of a conduit, the conduit containing a flowing mixture comprising an amount of low-boiling hydrocarbons and water, the method comprising providing in the mixture an amount of a protonated compound of general formula

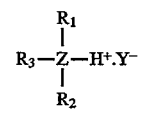

wherein $R_1$ and $R_2$ each are independently chosen from normal or branched alkyls containing a chain of at least 4 carbon atoms, $R_3$ is an organic moiety containing a chain of at least 4 atoms, Z is N or P, $Y^-$ is an anion, passing the mixture containing the alkylated compound through the conduit, and neutralizing the protonated compound at the end of the conduit to release a compound $R_1R_2R_3Z$. $R_1$, $R_2$, $R_3$ and Y may have the same preferred meanings as described above.

Preferably, $R_3$ is then a substituent containing a chain of at least 10 carbon atoms. The chain may be a polyethylene or polypropyleneglycol chain, but is preferably an alkyl or alkenyl chain. The chain length is suitably up to 20 carbon atoms. In the proposed method the compounds $R_1R_2R_3Z$, which are generally water-insoluble, are added to the hydrocarbon stream together with an acid HY, thereby forming the protonated compound. Usually some water is produced together with the production of hydrocarbons from an underground source ("produced water"). Whenever the produced water is acidic it may not be necessary to add any acid HY; addition of the compound $R_1R_2R_3Z$ may then suffice. The protonated compound is at least to some extent water-soluble and inhibits the formation of hydrate crystals.

$R_3$ can optionally be a $—(CH_2—CHR_5—O—)_nH$ or $—(CH_2—CH_2—NH—)$ group with $R_5$ being H or $CH_3$, n being an integer from 5 to 50, and m being an integer from 1 to 5.

At the end of the conduit or pipeline where the hydrocarbons are collected a basic compound may be added to the mixture to neutralize the protonated compound. Suitable basic compounds include alkali and alkaline earth metal hydroxides or carbonates. The neutralized compounds $R_1R_2R_3Z$ can then be separated from the hydrocarbons by any convenient means, such as filtration (in case of a solid compound) or another mechanical separation, e.g., via a cyclone or centrifuge.

Another possibility is to separate the mixture into an aqueous phase and a hydrocarbon phase before neutralization. The aqueous phase contains the protonated compound. After having recovered the aqueous phase it is neutralized, e.g., with the basic compounds described above and the water-insoluble compounds can then be easily recovered, e.g., by extraction with an organic solvent. It will be clear to the person skilled in the art that many organic solvents are suitable, e.g., hydrocarbons, halogenated hydrocarbons, and similar compounds. The remaining water phase contains an innocuous salt and may be disposed of. Instead of extraction the water-insoluble compounds can also be recovered by mechanical separation, e.g., cyclones or centrifuges. In a preferred embodiment the water-insoluble compound is taken up in a organic phase containing condensates and this phase is separated from the aqueous phase. This way of neutralization is particularly suitable when the water-insoluble compound is expensive or toxic to some extent, or may otherwise have a detrimental effect to the environment.

The amount of the alkylated compound used in the process according to the invention is generally between 0.1 and 11 wt %, preferably between 0.1 and 5 wt %, based on the amount of water in the hydrocarbon-containing mixture.

It will be understood that the compounds used are soluble in water at the concentration required and at a temperature of about 5° C.

The alkylated compounds according to the invention can be prepared in manners which are known in the art, from ingredients which are simple and abundantly available.

The alkylated compounds according to the invention can be added to the subject mixture of low-boiling hydrocarbons and water as their dry powder or, preferably, in concentrated solution. It is also possible, when $R_1$ is hydrogen, to add the basic compound and an acid, e.g., hydrogen chloride, hydrogen bromide, or sulfuric acid, separately.

The alkylated compounds according to the present invention can be used together with the polymers or copolymers of N-vinyl-2-pyrrolidone which are the subject of the aforementioned EPO Patent Application No. 92,201,725.6, and the combined effect is at least additive. The polymers or copolymers of N-vinyl-2-pyrrolidone are preferably added to an amount of between 0.05 and 4 wt %, based on the water content. The compounds may further be combined with film-forming agents which are known to prevent water-wetting of metal surfaces and to interfere with the agglomeration of any crystallites and with their adhesion to the wall of the conduit through which the mixture is passed. Typical examples of such film-forming agents are long-chain alkyl amines, alkyl diamines and imidazolines, optionally in combination with high molecular-weight organic acids. Monovalent and divalent salts of long-chain alkaryl sulphonic acids are also suitable as film-forming agents. These salts are disclosed in Applicant's European Patent Application No. 457,375.

The following Examples will illustrate the invention.

EXAMPLE 1

In this screening example, an aqueous solution of tetrahydrofurane (THF) was used as a model for wet gas, because THF in water is known to form hydrate (structure II) crystals at about the same temperature as wet gas, but at atmospheric pressure. For example, an 18.9 wt % aqueous solution of THF has a hydrate melting point of 4.3° C. at atmospheric pressure.

The effect of different additives on the growth of a single hydrate crystal was studied by adding 0.5 wt % (based on the total amount of liquid) of an additive to a solution of 18.9 wt % THF in water (approx. molar ratio 1:17), also containing 3 wt % of NaCl, and performing the experiments described below.

A glass vessel, open to atmospheric pressure and containing the solution to be tested is immersed in a thermostatically controlled bath. After thermal equilibrium has been reached, a capillary holding a small subcooled ice crystal (about 0.1 gram) is introduced into the solution. In a reference solution, not containing the additives according to the invention, this introduction of a small ice crystal seeds growth of large type II hydrate crystals which are easy to inspect visually. The morphology and weight of the hydrate crystals formed during the 180 minutes at 0° C. after the introduction of the capillary into the different solutions are determined and compared.

It was observed that under the above experimental conditions hydrate crystals grown in the reference solution (not containing additives) had a distinct and regular appearance. At the beginning of crystal growth geometrically perfect hexagonal plates were frequently observed, while at later stages the crystals acquired pyramidal shapes, the angles between the faces of the pyramids being 70.9 (+/−1.9) degrees. In all cases flat crystal planes intersected in sharp angles.

By contrast, the addition of 0.5 wt % of several of the ammonium or phosphonium salts mentioned hereafter, resulted under the above experimental conditions in the growth of severely deformed and much smaller hydrate crystals. Addition of the most active of these salts resulted in the formation of crystals having the appearance of a sheet of paper crushed into a ball, whereas other salts induced the formation of hydrate crystals exhibiting rounded edges between the crystal planes, sometimes to such an extent that flat crystal faces were barely visible.

Table 1 presents the results of a series of experiments 1.1–1.32, whereby 0.5 wt % of additives according to the invention were added, and comparative experiments 1.33–1.54 wherein 0.5% wt of similar compounds were added. In Example 1.55, no additive was employed. In Table 1, "alkyl" refers to "N-alkyl" unless otherwise indicated. After 180 minutes at 0° C., the crystals were weighed and their general appearance was classified as follows:

RP=Regular Pyramids
CS=Crumbled Sheet
RE=Rounded Edges

TABLE 1

| Ex. | Additive | Crystals Weight | Appearance |
|---|---|---|---|
| 1.1 | tetrapentylammoniumbromide | <0.1 grams | CS |
| 1.2 | tripentylbutylammoniumbromide | <0.1 grams | CS |
| 1.3 | triisopentybutylammoniumbromide | <0.1 grams | CS |
| 1.4 | tripentyldecylammonium bromide | <0.1 grams | CS |
| 1.5 | triisopentylammoniumsulphate | 0.1 grams | RE |
| 1.6 | tetrabutylphosphoniumchloride | 0.1 grams | RE |
| 1.7 | tributyldecylammoniumbromide | 0.4 grams | RE |
| 1.8 | 1,10-di(tribentylammonium)decamethylene dibromide | 0.1 grams | CS |
| 1.9 | tributyldecylammoniumbromide | 0.4 grams | RE |
| 1.10 | tributyldodecylammonium bromide | 0.5 grams | RE |
| 1.11 | tributylisopentylammoniumbromide | 0.6 grams | RE |
| 1.12 | dibutyldecylammonium sulphate | 0.6 grams | RE |
| 1.13 | tripentylammoniumsulphate | 0.8 grams | RP |
| 1.14 | tributylpentylammoniumbromide | 0.9 grams | RP |
| 1.15 | tributyltetradecylammoniumbromide (average of three determinations) | 1.1 grams | RE |
| 1.16 | tetrabutylammoniumbromide | 1.1 grams | RE |
| 1.17 | 1,6-di(tributylammonium)hexamethylene dibromide | 1.1 grams | RE |
| 1.18 | tetrabutylammoniumchloride | 1.2 grams | RE |
| 1.19 | tributylhexadecylphosphoniumbromide | 1.7 grams | CS |
| 1.20 | tetrabutylammonium-toluene-4-sulfonate | 1.9 grams | RE |
| 1.21 | 1,2-di(tripentylammonium)dimethylene dibromide | 2.1 grams | RE |
| 1.22 | tributylammoniumsulphate | 2.2 grams | RP |
| 1.23 | trihexylbutylammoniumbromide | 2.3 grams | RP |
| 1.24 | dibutypentylethanolammoniumbromide | 2.4 grams | RP |
| 1.25 | tributylheptylammoniumbromide | 2.6 grams | RP |
| 1.26 | 1,10-di(dibutylethanolammonium) | 3.0 grams | RP |

TABLE 1-continued

| Ex. | Additive | Crystals Weight | Appearance |
|---|---|---|---|
| | decamethylene dibromide | | |
| 1.27 | tetrahexylammoniumbenzonate | 3.8 grams | RP |
| 1.28 | tributylbenzylammonium bromide | 4.1 grams | RP |
| 1.29 | tetrahexylammoniumbromide | 4.4 grams | RP |
| 1.30 | tributylmethylammoniumbromide | 4.7 grams | RP |
| 1.31 | dibutyldodecylethanolammonium-bromide | 4.9 grams | CS |
| 1.32 | tetrahexylammoniumchloride | 5.7 grams | RP |
| 1.33 | triisobutylpentylammoniumbromide | 7.0 grams | RP |
| 1.34 | (3-dimethylaminopropyl) triphenylphosphoniumbromide | 7.0 grams | RP |
| 1.35 | dipentylammoniumsulphate | 7.4 grams | RP |
| 1.36 | tetramethylammoniumbromide | 7.4 grams | RP |
| 1.37 | dibutylethanolammonium sulphate | 7.9 grams | RP |
| 1.38 | methyltriphenylphosphoniumbromide | 8.0 grams | RP |
| 1.39 | 1,2-di(dimethyldodecylammonium) dimethylene dibromide | 9.3 grams | RP |
| 1.40 | tetradecyltrimethylammonium-bromide | 9.9 grams | RP |
| 1.41 | butyltriphenylphosphonium-bromide | 10.4 grams | RP |
| 1.42 | 1-ammonium-2-dibutylammonium dimethylene sulphate | 10.5 grams | RP |
| 1.43 | dibutyldecylamine | 10.6 grams | RP |
| 1.44 | tetrapropylammoniumbromide | 10.7 grams | RP |
| 1.45 | propyltriphenylphosphonium-bromide | 11.6 grams | RP |
| 1.46 | tetraphenylphosphoniumbromide | 12.0 grams | RP |
| 1.47 | 1,2-di(dimethylhexylammonium) dimethylene dibromide | 12.0 grams | RP |
| 1.48 | tetraethylammoniumbromide | 12.1 grams | RP |
| 1.49 | dodecyltrimethylammoniumbromide | 12.3 grams | RP |
| 1.50 | 2-dimethylaminoethyl-triphenyl phosphoniumbromide | 13.9 grams | RP |
| 1.51 | ethyltriphenylphosphoniumbromide | 14.0 grams | RP |
| 1.52 | trisobutylammonium sulphate | 15.6 grams | RP |
| 1.53 | ethylhexadecyldimethylammonium-bromide | 15.9 grams | RP |
| 1.54 | octadecyltrimethylammonium-bromide | 17.4 grams | RP |
| 1.55 | no additive (average of three determinations) | 13.2 grams | RP |

In the above results, the additives resulting in crystals having a weight of less than 3.0 grams and having a "crumbled sheet" (CS) appearance or "rounded edges" (RE) were considered to be particularly effective. It is apparent from the examples from 1.33 onwards that if the substituents to the nitrogen or phosphorus atom do not fulfil the requirements set in claim 1 the performance of the additives is less effective than if the substituents do fulfil these requirements, as is shown in the examples 1.1 to 1.32. The difference between 1.22 and 1.52 shows that if $R_1$, $R_2$ and $R_3$ do not contain a chain of at least 4 (carbon) atoms the performance of the compound is less effective.

EXAMPLE 2

Field flow conditions were simulated in an experimental set-up, comprising a two-liter stirred high-pressure autoclave connected via a gear pump to a coiled copper pipeline of 16 m length and 6 mm internal diameter which is immersed in a thermostatically controlled bath. The pressure difference between the inlet and outlet of the pipeline is continuously monitored by a differential pressure transmitter.

The autoclave was loaded at 13° C. with 400 ml of synthetic sea water (composed of 24.66 g NaCl, 11.33 g MgCl·6H$_2$O, 4.16 g Na$_2$SO$_4$, 1.13 g CaCl$_2$, 0.78 g Kcl and 0.09 g NaBr per liter of demineralized water) and with 800 ml of a typical gas condensate having the following composition:

0.02 mol % propane
2.41 mol % iso-butane
9.92 mol % n-butane
7.70 mol % iso-pentane
7.58 mol % n-pentane
14.07 mol % n-hexane
14.60 mol % fraction boiling between 70°–100° C. (major components methycyclopentane, benzene, cyclohexane, n-heptane, methylcyclohexene, toluene, and ethylcyclopentane)
22.45 mol % fraction boiling between 100°–150° C. (major components n-heptane, methylcyclohexane, toluene, ethylcyclohexane, octane, ethylbenzene, propylcyclohexane, xylene (P, M, O), nonane, decane, propylbenzene)
11.74 mol % fraction boiling between 150°–215° C. (major components include decane and undecane)
9.54 mol % fraction boiling above 215° C.

In addition, the autoclave was loaded with ethane until the pressure (at the starting temperature, 13° C.) within the autoclave was 2 Mpa. After loading and closing the autoclave, the stirred mixture was circulated through the system at a rate of 6.1 liters/hour. The temperature of the bath was lowered gradually, at a rate of 5° C. per hour, either until the pressure drop between the inlet and outlet of the coiled pipeline exceeded 0.1 MPa (at which stage the loop was considered to be blocked and the experiment terminated) or down to a pre-set minimum temperature of 0.5° C. or minus 1° C. If the loop did not block during the cooling stage, the circulation of the mixture was continued at the pre-set minimum value until plugging occurred. To initiate the formation of hydrates, a piece of dry ice (solid CO$_2$) was held against the inlet of the coiled pipeline. During the gradual cooling stage the pressure drop over the coiled pipeline and the temperature of the bath were continuously monitored as a function of time.

Without any additive, the pressure over the loop gradually increased until the pipeline "blocked" when the temperature of the bath reached 6° C.

When 0.5 wt % of tributyltetradecylammoniumbromide was added to the condensate-water mixture, the pipe reached the pre-set minimum temperature of 0.5° C. after which the mixture was circulated for another five hours before the pipeline suddenly blocked.

EXAMPLE 3

The experimental setup was as in Example 2, except that 200 ml of a 7 wt % solution of NaCl in water was used instead of 400 ml of synthetic sea water.

With no additive, the pressure drop over the pipeline gradually increased until the loop blocked when a temperature of 4.2° C. was reached.

When 0.5 wt % of tributylehexadecylphosphoniumbromide was added to the NaCl solution, the loop reached the pre-set temperature of −2° C., and was circulated for another 50 hours before the pipeline blocked.

EXAMPLE 4

In this example, field conditions were simulated by using a mixing tank, a stainless steel pipeloop having an inner diameter of 19 mm, and a gear pump for circulating a hydrate forming mixture of water and liquid hydrocarbons through the loop.

The part of the loop in which the formation and transport of gas hydrates under conditions of turbulent flow was studied was divided in three sections: The first section had a length of 72 meters and was surrounded by a coaxial pipe through which a temperature-controlled liquid was circulated in a direction opposite to that of the flowing hydrate forming mixture. The second section had a length of 24 meters and was thermally insulated. The last section had a length of 12 meters and was also surrounded by a coaxial pipe through which a temperature-controlled liquid was circulated in counterflow to the hydrate forming medium. The pressure drop over 9 consecutive parts of the pipeloop, each having a length of 12 meters, was measured by means of differential pressure meters. Thermometers were placed at intervals of 12 meters to monitor the temperature of the hydrate forming medium along the loop. Finally, two viewing windows were mounted near the inlet and outlet of the second section to allow visual observation of the hydrate forming mixture.

For each of these experiments the apparatus was loaded with a hydrate-forming medium, consisting of 5 liters of water, 7.6 kilograms of ethane and 50 liters of "SHELLSOL D60" (trade name for a mixture of paraffinic and naphthenic hydrocarbons, mainly in the $C_{10}$–$C_{12}$ range, available from Shell Oil Company, Houston, Tex.).

Prior to the start-up of the experiments, the hydrate forming medium was circulated through the loop at a rate of 510 liters per hour. During this period the temperature of the liquids flowing through the coaxial pipes surrounding the first and third sections was continuously adjusted until the temperature of the hydrate forming medium was, at every point along the loop, 16° C. The pressure drop over the length of the pipe at this pre-experimental steady state was 25 kPa.

The temperature of the liquid surrounding the first section was lowered continuously so as to cause the temperature $T_1$ of the hydrate forming medium at the end of the second section to be lowered by 1.0° C. per hour. Simultaneously the temperature of liquid surrounding the third section was increased to ensure that the hydrate forming mixture re-enters the first section at a constant temperature of 16° C.

In this mode of operation the temperature of the hydrate forming medium rapidly drops over the first 36 meters of the loop after which it becomes practically constant and identical to $T_1$ for another 60 meters before it rises to 16° C. in the last section.

Hydrate formation was triggered by cooling 1 $cm^2$ of the inner surface of the first section, halfway its length, to a constant temperature of −15° C.

Results of this experiment are listed below in Table 2.

TABLE 2

| Exp. no | Hydrate-forming medium | Additives | Temperature at which pressure drop starts to increase (°C.) | Blocking temperature (°C.) | Remarks |
|---|---|---|---|---|---|
| 4.1A | 50 liters SSD60 5 liters Brine 1 7.6 kg ethane | none | 6.4 | 5.4 | |
| 4.1B | as in 1A | 0.45% wt TBHPB | <−3.5 | <−3.5 | smooth re-start after 120 hrs shut-in period |
| 4.2A | 45 liters SSD60 5 liters toluene 5 liters Brine 2 8 kg ethane | none | 8.2 | 7.3 | |
| 4.2B | as in 2A | 0.25% wt TBHPB | 0.1 | −0.3 | blockage after 24 min at −0.3°C. |
| 4.2C | as in 2A | 0.5% wt TBHPB | <−2.0 | <−2.0 | no blockage |
| 4.3A | 47.5 liters SSD60 2.5 liters toluene 5 liters water 8.0 kg ethane | none | 9.2 | 8.4 | |
| 4.3B | as in 3A | 0.1% wt TBHPB + 0.3% wt TBDAB | 0.0 | 0.0 | blockage after 70 hours |
| 4.3C | as in 3A | 0.1% wt TBHPB + 0.4% wt TBDAB | 0.0 | 0.0 | blockage after 74 hours |
| 4.3D | as in 3A | 0.2% wt TBHPB + 0.4% wt TBDAB | 0.0 | 0.0 | blockage after 77 hours |
| 4.4A | as in 3A | none | 9.4 | 8.3 | |
| 4.4B | as in 3A | 0.25% wt TBDAB + 0.25% wt TBOAB | 0.4 | 0.1 | blockage at 0.1° C. after 18 min |

It is apparent that the temperatures at which pressure increases take place are substantially lowered by the use of the additives, even at very low concentrations (see, e.g., Exp. 4.2B). In the cases of experiments 4.1B and 4.2C there was no pressure increase or blocking at all. Hence it is apparent that TBHPB is an excellent hydrate inhibitor.

In Table 2 SSD60 stands for "SHELLSOL D60" as described above, Brine 1 is a 7% wt solution of NaCl in water, Brine 2 is a solution of 43.5 g NaCl, 11.1 g KCl, 117.4 g $CaCl_2$, 29.8 g $MgCl_2 \cdot 6H_2O$, 5.7 $SrCl_2 \cdot 6H_2$) in 5 liters of water; TPAB is tetrapentylammoniumbromide, TBHPB is tributylhexadecylphosphonium bromide, TBDAB is tributyldecylammoniumbromide, and TBOAB is tributyloctadecylammonium bromide.

Table 2 indicates the temperatures at which a notable pressure increase was found (except experiments 1B and 2C where no significant pressure increase was encountered). In all experiments, the temperature at which there occurred an increase of 0.01 kPa in the pressure drop over the length of the pipe, and the temperature at which the flow in the pipe stopped entirely, (blocking temperature) were noted. When no pressure drop could be noted, the system was cooled downto a pre-set temperature of minus 3.5° C. (Exp. 1B) and 0° C. (Exp. 2C), and circulation maintained for 70 and 78 hours, respectively.

EXAMPLE 5

Experiment 1.12, i.e., using dibutyldecylammonium sulphate, was repeated. Before crystallization occurred the protonated compound was neutralized by adding a solution of NaOH to the THF/water mixture. The corresponding amine (dibutyldecylamine) started to separate from the THF/water mixture and started to float on top of this mixture, indicating that recovery from the mixture via centrifuging or extraction would be easy. This experiment shows that the invention provides a simple method for the recovery of the hydrate inhibitors.

We claim:

1. A method for inhibiting the plugging of a conduit, the conduit containing a flowing mixture comprising an amount of hydrocarbons having from one to five carbons and an amount of water wherein the amounts of hydrocarbons and water could form hydrates at conduit temperatures and pressures, the method comprising the steps of:

adding to the mixture an amount of a hydrate formation inhibitor component of the formula

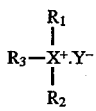

wherein $R_1$ and $R_2$ are independently chosen from the group consisting of normal and branched alkyls having at least 4 carbon atoms, $R_3$ is an organic moiety containing a chain of at least 4 atoms, X is selected from the group consisting of S, N—$R_4$, and P—$R_4$, $R_4$ is selected from the group consisting of hydrogen and an organic substituent; and Y⁻ is an anion, the amount of the hydrate formation inhibitor effective to inhibit formation of hydrates in the mixture at conduit temperatures and pressures; and flowing the mixture containing the hydrate formation inhibitor through the conduit.

2. The method of claim 1 in which $R_3$ is selected from the group consisting of alkyl, alkenyl, aryl, arylalkyl, arylalkenyl, alkylaryl and alkenylaryl groups.

3. The method of claim 1 in which $R_3$ contains a chain containing one or more heteroatoms.

4. The method of claim 3 in which $R_3$ is a —(CH$_2$—CHR$_5$—O—)$_n$H or —(CH$_2$—CH$_2$—NH—)$_m$CH$_2$—CH$_3$ group, with $R_5$ being H or CH$_3$, n being an integer from 5 to 50, and m being an integer from 1 to 5.

5. The method of claim 2 in which $R_3$ is selected from the group consisting of alkyl and alkenyl groups with 4 to 20 carbon atoms.

6. The method of claim 5 in which $R_3$ is selected from the group consisting of alkyl and alkenyl groups, with 10 to 20 carbon atoms.

7. The method of claim 1 in which $R_1$, $R_2$ and $R_3$ each have from 4 to 6 carbon atoms.

8. The method of claim 1 in which X is selected from the group consisting of N—$R_4$ and P—$R_4$.

9. The method of claim 8 in which $R_4$ is selected from the group consisting of alkyls, alkenyls, aryls, arylalkyls, arylalkenyls, alkylaryls and alkenylaryls, having from 1 to 20 carbon atoms.

10. The method of claim 9 in which $R_4$ is selected from the group consisting of alkyls or alkenyls having from 4 to 20 carbon atoms.

11. The method of claim 8 in which $R_4$ is 9-octa-decenyl.

12. The method of claim 8 in which $R_4$ is also chemically bonded to a polymer.

13. The method of claim 1 in which the hydrate formation inhibitor comprises a cation selected from the group consisting of tributyldecylammonium, tripentyldecylammonium, tributylhexadecylammonium, tributyloleylphosphonium, tributylhexadecylphosphonium and tributyloleylphosphonium.

14. The method of claim 1 wherein the anion is chosen from the group consisting of hydroxides, carboxylates, halides, sulphates and organic sulphonates.

15. The method of claim 1 wherein between 0.05 and 5 wt %, based on the water content, of the hydrate formation inhibitor is added to the hydrocarbon/water mixture.

16. The method of claim 15 wherein the amount of hydrate formation inhibitor added is between 0.1 and 1 wt % based on the water.

17. The method of claim 1 in which $R_4$ is hydrogen.

18. The method of claim 17 in which R is an alkyl or alkenyl group having from 10 to 20 carbon atoms.

19. A method for inhibiting the plugging of a conduit, the conduit containing a flowing mixture comprising an amount of low-boiling hydrocarbons and water, wherein the amount of hydrocarbons and water could form hydrates at conduit temperatures and pressure, the method comprising the steps of:

adding to the mixture an amount of a protonated compound of general formula

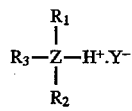

wherein $R_1$ and $R_2$ each are independently chosen from normal or branched alkyls containing a chain of at least 4 carbon atoms, $R_3$ is an organic moiety containing a chain of at least 4 atoms, Z is N or P, Y— is an anion, passing the mixture containing the protonated compound through the conduit, and neutralizing the protonated compound at the end of the conduit to release a compound $R_1R_2R_3Z$.

20. The method of claim 19 in which prior to neutralization the mixture is separated into a hydrocarbon phase and an aqueous phase, the aqueous phase is neutralized, and the compound $R_1R_2R_3Z$ is recovered from the neutralized aqueous phase.

21. The method of claim 1 wherein the flowing mixture within the conduit further comprises a water soluble salt.

22. The method of claim 1 wherein the salt is sodium chloride.

23. The method of claim 22 wherein the amount of sodium chloride is between about 0.9 to about 7 percent by weight based on the water flowing in the conduit.

24. The method of claim 23 wherein the amount of sodium chloride is about three percent by weight based on the water flowing in the conduit.

25. The method of claim 23 wherein the amount of sodium chloride is about 2.4 percent by weight based on the water flowing in the conduit.

26. The method of claim 21 wherein $R_4$ contains at least one oxygen.

27. The method of claim 26 wherein $R_4$ contains one oxygen.

28. The method of claim 27 wherein the oxygen in $R_4$ is an ether link.

* * * * *